(12) United States Patent
Pal et al.

(10) Patent No.: US 7,864,506 B2
(45) Date of Patent: Jan. 4, 2011

(54) SYSTEM AND METHOD OF FILM CAPACITOR COOLING

(75) Inventors: Debabrata Pal, Hoffman Estates, IL (US); John Huss, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 459 days.

(21) Appl. No.: 11/947,818

(22) Filed: Nov. 30, 2007

(65) Prior Publication Data

US 2009/0141419 A1 Jun. 4, 2009

(51) Int. Cl.
*H01G 4/06* (2006.01)

(52) U.S. Cl. .............. 361/311; 361/312; 361/313; 361/303; 361/321.1; 361/321.2

(58) Field of Classification Search .......... 361/502, 361/503–504, 508–512, 525–528, 311–313
See application file for complete search history.

(56) References Cited

U.S. PATENT DOCUMENTS

| | | | |
|---|---|---|---|
| 4,117,712 A | 10/1978 | Hager, Jr. | |
| 4,168,507 A | 9/1979 | Yester, Jr. | |
| 4,222,090 A | 9/1980 | Jaffe | |
| 4,310,792 A | 1/1982 | Iwatani et al. | |
| 4,506,198 A | 3/1985 | Savas | |
| 4,707,726 A | 11/1987 | Tinder | |
| 4,755,866 A | 7/1988 | Marshall et al. | |
| 5,119,063 A | 6/1992 | Nonnenmacher et al. | |
| 5,181,313 A | 1/1993 | Nonnenmacher et al. | |
| 6,433,993 B1 * | 8/2002 | Hunt et al. | 361/303 |
| 6,468,689 B1 * | 10/2002 | Hallaj et al. | 429/120 |
| 6,758,264 B2 | 7/2004 | Azuma | |
| 6,856,501 B2 * | 2/2005 | Matsuhashi | 361/321.1 |
| 6,910,266 B2 * | 6/2005 | Lee et al. | 29/832 |
| 7,025,607 B1 * | 4/2006 | Das et al. | 439/91 |
| 7,092,238 B2 | 8/2006 | Salito et al. | |
| 7,273,987 B2 | 9/2007 | Becker et al. | |
| 7,511,942 B2 * | 3/2009 | Thrap | 361/502 |

* cited by examiner

*Primary Examiner*—Nguyen T Ha
(74) *Attorney, Agent, or Firm*—Carlson Gaskey & Olds PC

(57) ABSTRACT

Film capacitor assembly has a plurality of film capacitive layers for storing an electric charge. The plurality of film capacitive layers have a first metal contact and a second metal contact. A heat sink removes heat from the plurality of film capacitive layers. The heat sink is in thermal conductive communication with at least one of the first metal contact and the second metal contact. A dielectric material is configured to prevent a transmission of electric current through the heat sink from the plurality of film capacitor capacitive layers.

20 Claims, 4 Drawing Sheets

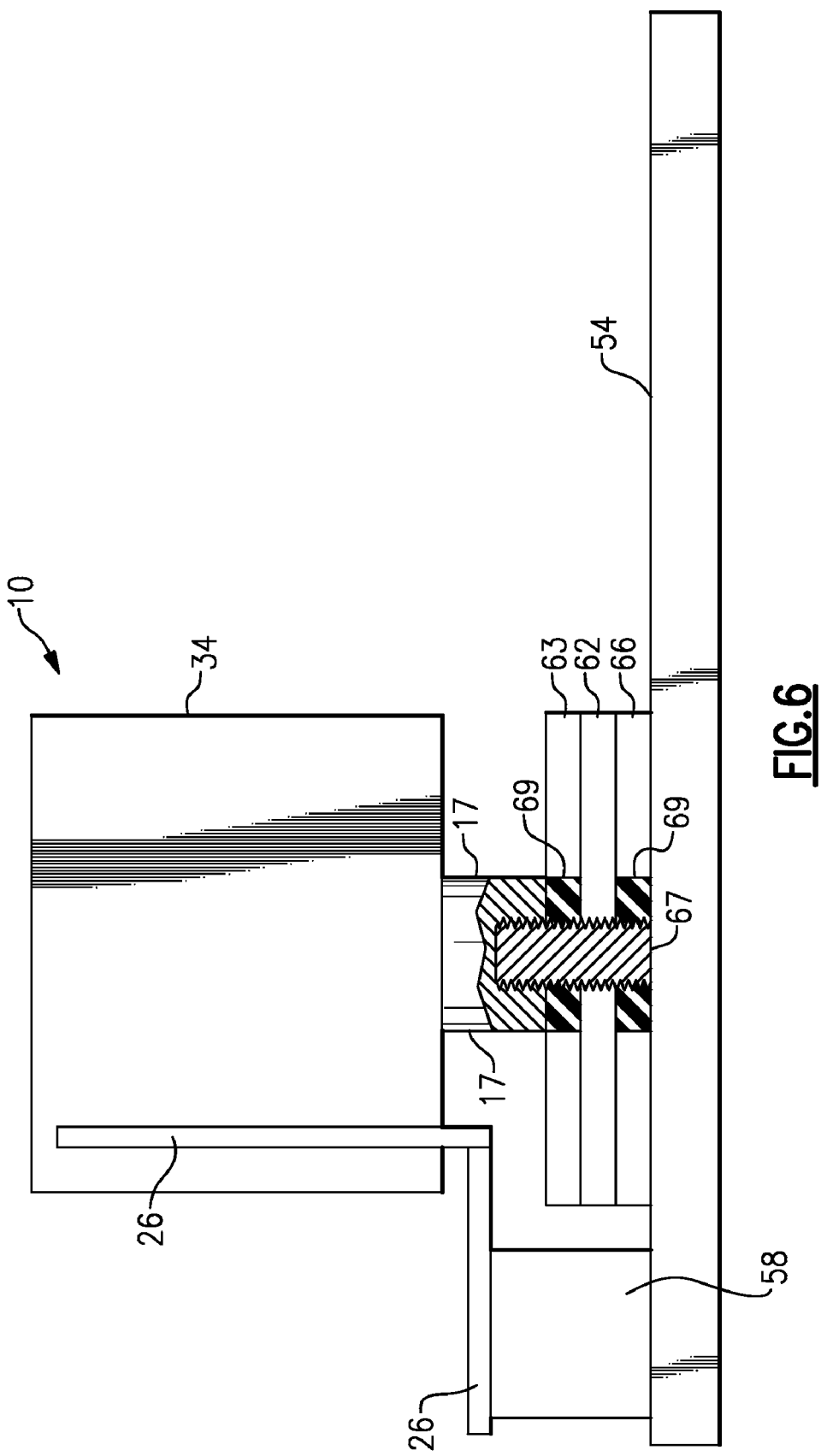

SYSTEM AND METHOD OF FILM CAPACITOR COOLING

BACKGROUND OF THE INVENTION

This invention relates to a system and method for cooling a film capacitor.

A film capacitor has two or more layers of a dielectric material, such as plastic. The dielectric material is metallized by depositing metal using vacuum deposition or spray to make the material electrically conductive. The two layers are then rolled and compacted. The ends of the roll are sprayed with a metal to make the ends electrically conductive. These rolls are then placed in a housing, which may be sealed with an epoxy resin.

Due to the nature of the dielectric material, the film capacitor may be sensitive to heat. Often times, these capacitors are the most temperature limiting parts inside of a motor controller used in aircraft application or similar products. The location of the film capacitor within the epoxy resin may further adversely affect the ability of the film capacitor to eliminate excess heat. Consequently, the film capacitor may overheat. As electric storage demands increase, there is an even greater need for the removal of excess heat from the film capacitor.

A need therefore exists for a film capacitor assembly that easily and inexpensively eliminates excess heat and prevents overheating.

SUMMARY OF THE INVENTION

A film capacitor assembly has a plurality of film capacitive layers for storing an electrical charge. The plurality of film capacitor layers have a first metal contact and a second metal contact. A heat sink is provided to remove heat from the plurality of film capacitive layers. The heat sink is in thermal conductive communication with at least one of the first metal contact and the second metal contact. A dielectric material is provided to prevent a transmission of electric current through the heat sink from the plurality of film capacitive layers.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6 illustrates a side exposed view of a film capacitor assembly mounted on a cold plate.

DETAILED DESCRIPTION OF THE PREFERRED EMBODIMENT

Figure 1:
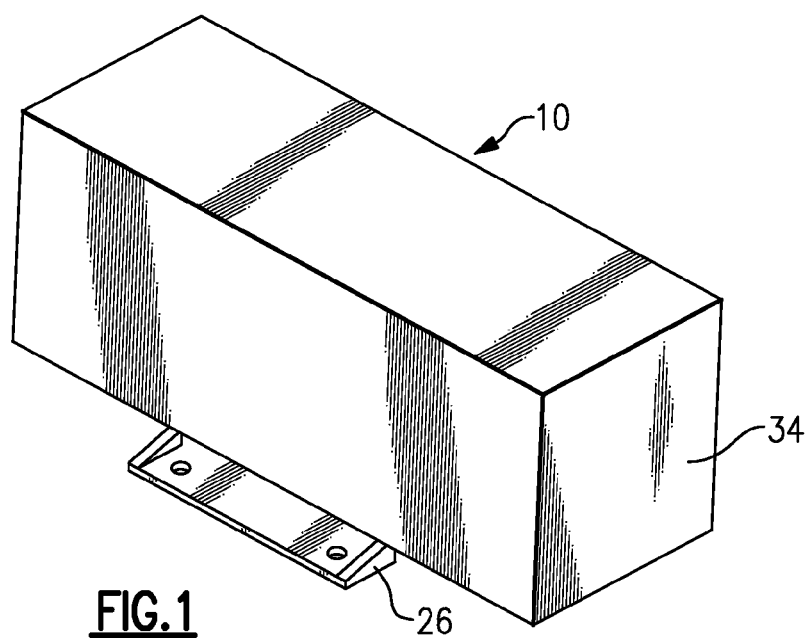
FIG. 1 illustrates a perspective view of a film capacitor assembly with heat sink.
Figure 2:
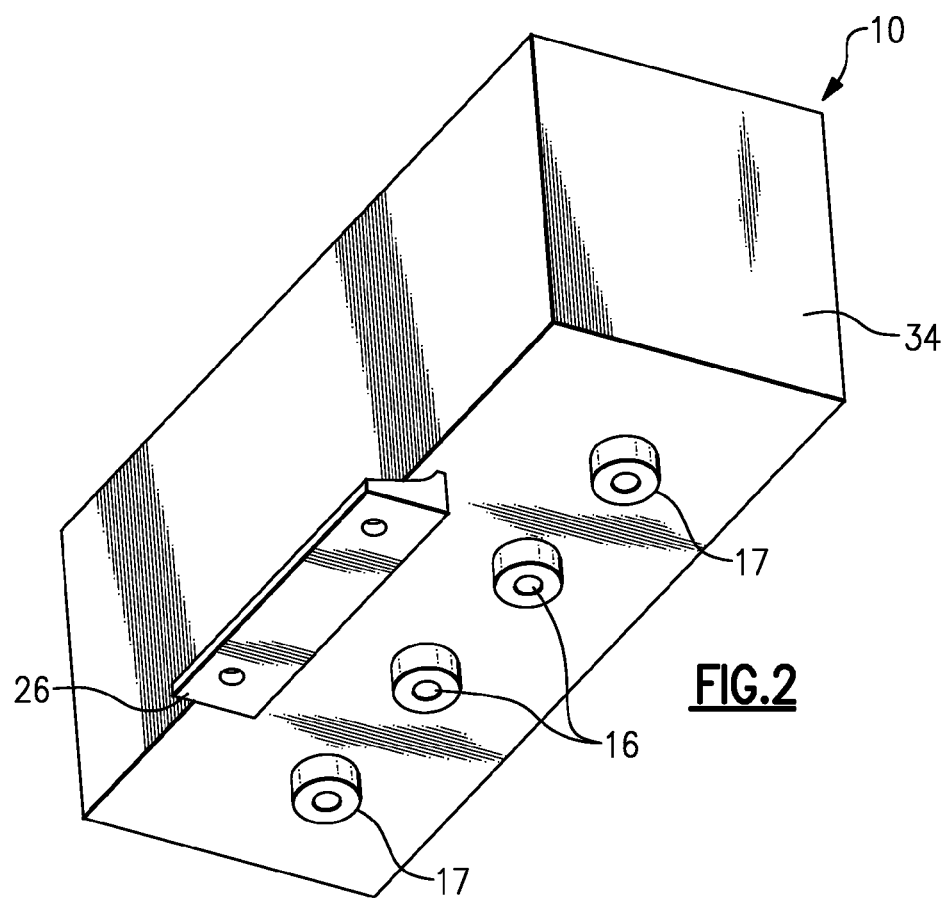
FIG. 2 illustrates a bottom perspective view of the film capacitor assembly of FIG. 1, showing the location of heat sink relative to capacitor terminals.

With reference to FIGS. 1 and 2, there is shown film capacitor assembly 10. FIG. 1 shows a perspective view of film capacitor assembly 10, showing heat sink 26 extending from housing 34. As shown in FIG. 2, also extending from housing are positive capacitor terminals 16 and negative capacitor terminals 17.

Figure 3A:
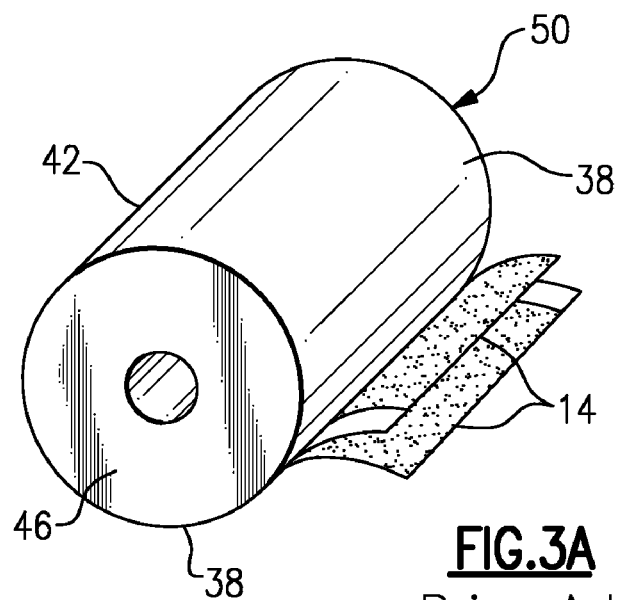
FIG. 3A illustrates a film capacitor, having a first end and a second end.
Figure 3B:
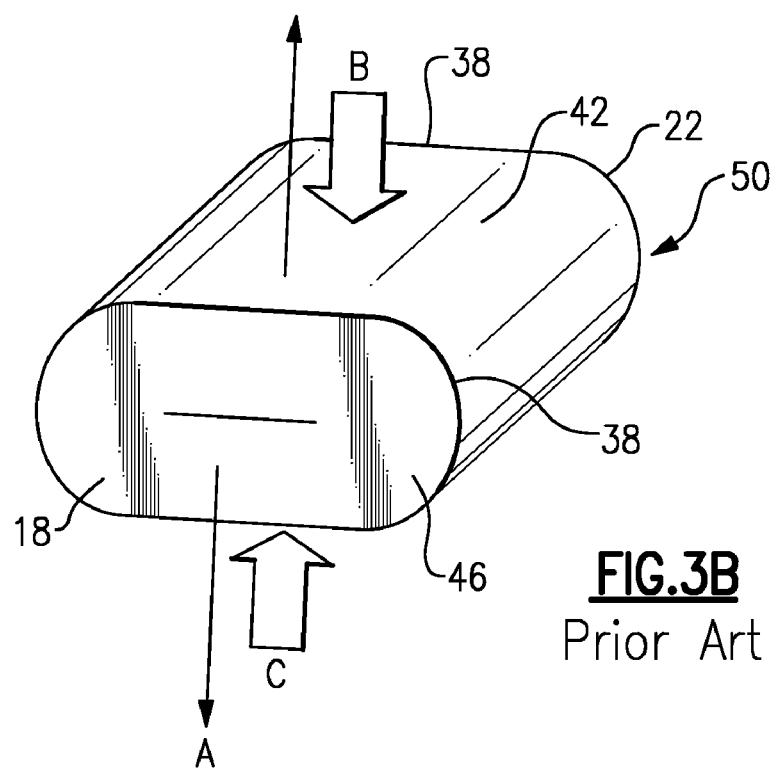
FIG. 3B illustrates the film capacitor of FIG. 3A in compacted form.

Housing 34 contains a number of film capacitor rolls 42. As shown in FIG. 3A as known, each film capacitor roll 42 is created from a plurality of film capacitive layers 14, made from metalized plastic layers, which are rolled to form film capacitor roll 42 having first end 46 and second end 50. The plurality of film capacitive layers 14 form edges 38 at first end 46 and second end 50. With reference to FIG. 3B, film capacitor roll 42 is then compacted by applying a compressive force in the direction of arrows B and C as shown. The compacted roll, film capacitor roll 42, then has metallic spray applied to first end 46 and second end 50 to form first metal contact 18 and second metal contact 22. Film capacitor rolls 42 have plurality of film capacitive layers 14 stacked along axis A as shown in FIG. 3B.

Figure 4:
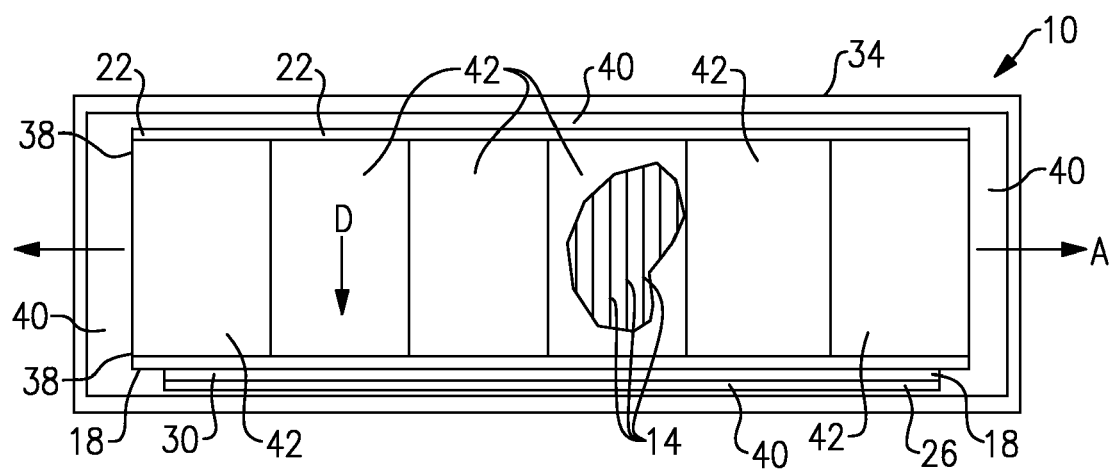
FIG. 4 illustrates a top exposed view of the film capacitor assembly of FIGS. 1 and 2, showing film capacitors, heat sink and dielectric material.

With reference to FIG. 4, film capacitor rolls 42 are then placed in housing 34 as shown. An epoxy resin 40 is placed around film capacitor rolls 42 to seal film capacitor rolls 42 against moisture. Housing 34 and epoxy resin 40 encase film capacitor rolls 42. To remove heat from film capacitor rolls 42, heat sink 26 is placed in proximity to at least one of first metal contact 18 and second metal contact 22. Heat sink 26 should be placed close enough to one of said metal contacts 18, 22, here first metal contact 18, to permit thermal conduction of heat from film capacitor rolls 42. Heat sink 26 is a metal, such as copper or aluminum, extending out of housing 34 as shown in FIGS. 1 and 2, that permits thermal conduction of heat out of housing 34. As a consequence, heat may be eliminated from film capacitor rolls 42 so as to prevent a build-up of heat in the film capacitor rolls 42.

Because of the electrically conductive nature of metal of heat sink 26, there is provided dielectric material 30 disposed between first metal contact 18 and heat sink 26. Dielectric material 30 prevents the transmission of an electric current through heat sink 26 to prevent the leakage of charge. Dielectric material 30 is made of a thin sheet of polyamide plastic, such as Kapton™ made by DuPont or Silpad S™ made by Berguist. Dielectric material 30 is thin enough, say 0.005 inches or 0.127 mm, to permit thermal conduction of heat from film capacitor rolls 42 to heat sink 26 while thick enough to prevent the transmission of electrical current from film capacitor rolls 42 to heat sink 26. In this way, heat may be transferred out of housing 34 without leaking electrical charge. Dielectric material 30 is glued to both heat sink 26 and first metal contact 18 with Armstrong 661 glue.

With reference to FIG. 4, plurality of film capacitive layers 14 are stacked along axis A. Heat sink 26 is located proximate edge 38 of film capacitor rolls 42 and arranged generally parallel to axis A. In this arrangement, heat may be transferred in the direction of arrow D, which is toward edge 38 rather than through each of the plurality of film capacitive layers 14. This arrangement provides a more efficient path for thermal conduction of heat from film capacitor rolls 42 to heat sink 26 than attempting to transfer heat through a stack of layers of film.

Figure 5:
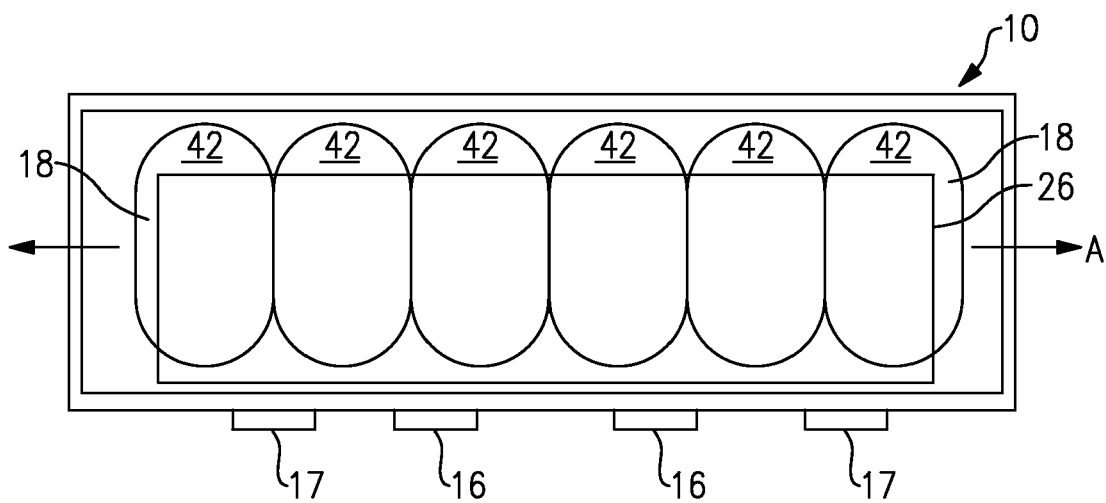
FIG. 5 illustrates a side exposed view of the film capacitor assembly shown in FIG. 4, showing the location of heat sink relative to film capacitors.

With reference to FIG. 5, heat sink 26 is a rectangular shape extending along axis A across film capacitor rolls 42. Other shapes can be envisioned without deviating from the teachings of this disclosure.

With reference to FIG. 6, as part of a motor controller for a vehicle, such as an aircraft, film capacitor assembly 10 may be mounted on cold plate 54. Heat sink 26 is mounted on a thermally conductive mounting boss 58, which itself is attached to cold plate 54. As shown, there are three laminated bus bars, positive bus bar 63, negative bus bar 62 and ground bus bar 66. Each bar 62, 63 and 66 is insulated from the other as known and mounted to cold plate. Negative bus bar 62 is screwed to metal screw 67, which extends through positive bus bar 63 and is screwed to negative capacitor terminal 17. In this way, electrical connections are created between negative bus bar 62 and negative capacitor terminals 17. Screw 67 has electrically insulating washers 69, preventing an electrical connection between positive bus bar 63 and ground bus bar 66. Similarly, but not shown, positive bus bar 63 is electrically connected to positive capacitor terminals 16 and insulated from negative bus bar 62 and ground bus bar 66.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A film capacitor assembly, comprising:
   a plurality of film capacitive layers for storing an electric charge, said plurality of film capacitive layers having a first metal contact and a second metal contact;
   a heat sink for removing heat from said plurality of film capacitive layers, said heat sink in thermal conductive communication with at least one of said first metal contact and said second metal contact; and
   a dielectric material configured to prevent a transmission of electric current to said heat sink from said plurality of film capacitive layers, said dielectric material directly contacting at least one of said first metal contact and said second metal contact.

2. The film capacitor assembly of claim 1 wherein said dielectric material is in contact with said heat sink.

3. The film capacitor of claim 2 wherein said dielectric material is disposed between said heat sink and said at least one of said first metal contact and said second metal contact, said dielectric material configured both to electrically insulate said heat sink from said plurality of film capacitive layers and to thermally conduct heat from said plurality of film capacitive layers to said heat sink.

4. The film capacitor assembly of claim 1 wherein said plurality of film capacitive layers comprises a metalized plastic layer.

5. The film capacitor assembly of claim 1 wherein said dielectric material comprises a plastic.

6. The film capacitor assembly of claim 5 wherein said plastic comprises a polyamide.

7. The film capacitor assembly of claim 1 further comprising a housing for said plurality of film capacitive layers.

8. The film capacitor assembly of claim 7 wherein said heat sink extends out of said housing.

9. The film capacitor assembly of claim 7 wherein said dielectric material is disposed in said housing.

10. The film capacitor assembly of claim 1 including a housing for said plurality of film capacitive layers.

11. The film capacitor assembly of claim 10 wherein said heat sink extends out of said housing.

12. The film capacitor assembly of claim 10 wherein said dielectric material is disposed in said housing.

13. The film capacitor assembly of claim 1 wherein said dielectric material directly contacts said first metal contact and said second metal contact.

14. The film capacitor assembly of claim 8 wherein said heat sink is configured to communicate heat from said plurality of film capacitive layers to a cold plate.

15. The film capacitor assembly of claim 14 including a thermally conductive mounting boss configured to directly contact said heat sink and said cold plate.

16. A film capacitor assembly, comprising:
   a plurality of film capacitive layers for storing an electric charge, said plurality of film capacitive layers comprising a metalized plastic layer and having a first metal contact and a second metal contact;
   a heat sink for removing heat from said plurality of film capacitive layers, said heat sink in thermal conductive communication with at least one of said first metal contact and said second metal contact;
   a dielectric material in contact with said heat sink and said first metal contact, said dielectric material configured to prevent transmission of electric current to said heat sink from said plurality of film capacitive layers; and
   wherein said plurality of film capacitive layers are disposed along an axis and form an edge, said heat sink extending generally along said first axis proximate said edge.

17. The film capacitor of claim 16 wherein said dielectric material is disposed between said heat sink and said at least one of said first metal contact and said second metal contact, said dielectric material configured both to electrically insulate said heat sink from said plurality of film capacitive layers and to thermally conduct heat from said plurality of film capacitive layers to said heat sink.

18. The film capacitor assembly of claim 16 wherein said dielectric material comprises a plastic.

19. The film capacitor assembly of claim 18 wherein said plastic comprises a polyamide.

20. A method of manufacturing a film capacitor assembly, comprising the steps of:
   providing a plurality of film capacitive layers for storing an electric charge, the plurality of film capacitive layers having a first metal contact and a second metal contact;
   disposing a heat sink communicating heat from the plurality of film capacitive layers to a cold plate; and
   placing a dielectric material between the heat sink and the at least one of the first metal contact and the second metal contact.

* * * * *